United States Patent
Chen et al.

(10) Patent No.: US 11,401,619 B2
(45) Date of Patent: Aug. 2, 2022

(54) SACRIFICIAL COATING AND PROCEDURE FOR ELECTROPLATING ALUMINUM ON ALUMINUM ALLOYS

(71) Applicant: United Technologies Corporation, Farmington, CT (US)

(72) Inventors: Lei Chen, South Windsor, CT (US); Xiaomei Yu, Westport, CT (US); Mark R. Jaworowski, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 83 days.

(21) Appl. No.: 15/977,698

(22) Filed: May 11, 2018

(65) Prior Publication Data
US 2018/0327923 A1    Nov. 15, 2018

Related U.S. Application Data

(62) Division of application No. 14/776,355, filed as application No. PCT/US2014/023449 on Mar. 11, 2014, now abandoned.
(Continued)

(51) Int. Cl.
*C25D 3/66* (2006.01)
*C25F 3/00* (2006.01)
(Continued)

(52) U.S. Cl.
CPC ............ *C25D 3/665* (2013.01); *B32B 15/016* (2013.01); *C23C 18/1653* (2013.01);
(Continued)

(58) Field of Classification Search
CPC ........ C25D 3/665; C25D 5/44; B32B 15/016; C25F 5/00; C25F 3/00; C23C 18/54; C23C 18/1653
See application file for complete search history.

(56) References Cited

U.S. PATENT DOCUMENTS 4,126,483 A * 11/1978 Donakowski ............ C23G 1/22
                                                      134/28
5,601,695 A    2/1997 Muranushi
(Continued)

FOREIGN PATENT DOCUMENTS

CN    101781785 A       7/2010
CN    102912394 A   *   2/2013
(Continued)

OTHER PUBLICATIONS

Extended European Search Report, for European Patent Application No. 14767605.0, dated Oct. 11, 2016, 16 pages.
(Continued)

*Primary Examiner* — Louis J Rufo
(74) *Attorney, Agent, or Firm* — Kinney & Lange, P.A.

(57) ABSTRACT

A method of applying a protective coating with improved adhesion on an aluminum alloy component includes first pretreating the surface of a component by depositing a sacrificial protective immersion layer using a zincating or similar process. Portions of the protective immersion layer as well as portions of the underlying aluminum alloy substrate are then electrolytically etched off in an ionic liquid. A protective aluminum coating is then electrodeposited on the component in an ionic liquid.

9 Claims, 4 Drawing Sheets

Related U.S. Application Data

(60) Provisional application No. 61/787,608, filed on Mar. 15, 2013.

(51) Int. Cl.
  *C25F 5/00* (2006.01)
  *C25D 5/44* (2006.01)
  *C23C 18/16* (2006.01)
  *C23C 18/54* (2006.01)
  *B32B 15/01* (2006.01)

(52) U.S. Cl.
  CPC .............. *C23C 18/54* (2013.01); *C25D 5/44* (2013.01); *C25F 3/00* (2013.01); *C25F 5/00* (2013.01)

(56) References Cited

U.S. PATENT DOCUMENTS

| | | | |
|---|---|---|---|
| 6,056,864 A | 5/2000 | Cheung | |
| 2002/0100694 A1 | 8/2002 | Morin et al. | |
| 2004/0067314 A1 | 4/2004 | Joshi et al. | |
| 2004/0097755 A1* | 5/2004 | Abbott | B01J 31/006 562/553 |
| 2004/0173467 A1 | 9/2004 | Joshi et al. | |
| 2006/0254922 A1 | 11/2006 | Brevnov et al. | |
| 2008/0241517 A1* | 10/2008 | Kenworthy | B32B 15/01 428/332 |
| 2011/0024299 A1* | 2/2011 | Reusmann | C25D 15/00 205/50 |
| 2012/0006688 A1* | 1/2012 | Alemany | C25D 3/665 205/261 |
| 2014/0205856 A1* | 7/2014 | Jiang | A44C 21/00 428/650 |
| 2015/0322582 A1* | 11/2015 | Freydina | C25F 1/12 428/629 |
| 2015/0376810 A1* | 12/2015 | Browning | C23C 28/322 205/50 |

FOREIGN PATENT DOCUMENTS

| | | |
|---|---|---|
| JP | H11269696 A | 10/1999 |
| WO | 2010106072 A2 | 9/2010 |
| WO | 2014099348 A1 | 6/2014 |

OTHER PUBLICATIONS

International Search Report & Written Opinion, for PCT Patent Application No. PCT/US2014/023449, dated Jul. 7, 2014, 12 pages.
Kamavaram, Venkat et al. "Electrochemical Studies of Aluminum Deposition in Ionic Liquids at Ambient Temperatures", University of Alabama: Department of Metallurgy and Materials Engineering, The Minerals, Metals & Materials Society, dated 2002, 6 pages.

* cited by examiner

SACRIFICIAL COATING AND PROCEDURE FOR ELECTROPLATING ALUMINUM ON ALUMINUM ALLOYS

CROSS-REFERENCE TO RELATED APPLICATION(S)

This application is a divisional of U.S. application Ser. No. 14/776,355 filed Sep. 14, 2015 for "SACRIFICIAL COATING AND PROCEDURE FOR ELECTROPLATING ALUMINUM ON ALUMINUM ALLOYS" by L. Chen, X. Yu and M. Jaworowski, which is the National Phase of PCT International Application No. PCT/US2014/023449 filed Mar. 11, 2014 for "SACRIFICIAL COATING AND PROCEDURE FOR ELECTROPLATING ALUMINUM ON ALUMINUM ALLOYS" by L. Chen, X. Yu and M. Jaworowski, which in turn claims the benefit of U.S. Provisional Application No. 61/787,608 filed Mar. 15, 2013 for "SACRIFICIAL COATING AND PROCEDURE FOR ELECTROPLATING ALUMINUM ON ALUMINUM ALLOYS" by L. Chen, X. Yu and M. Jaworowski, all of which are incorporated herein by reference.

BACKGROUND

The application relates generally to coating of metallic substrates and more specifically to the use of an electrolytically tailored interlayer to enhance electrodeposited aluminum coating adhesion on aluminum alloys.

Aluminum alloys in general, and high strength aluminum alloys in particular, are prone to localized corrosion. The presence of precipitates such as intermetallic particles in these Al alloys is responsible for pitting corrosion susceptibility of these alloys. The aluminum matrix of these alloys is chemically reactive and naturally forms an oxide film in the presence of water and air. The oxide offers some protection but offers little resistance to galvanic and pitting corrosion attack. It is known that pure aluminum is significantly resistant to corrosion, in particular, localized corrosion such as pitting. Thus, coating aluminum alloy components with pure aluminum is an effective method to protect aluminum alloy structures and extend their lifetime.

Electrodeposition of aluminum from aqueous solutions is not possible because the electronegativity of aluminum in relation to water is such that hydrogen will form in deference to aluminum deposition in a plating bath. The only commercialized aluminum electroplating technology in the U.S. is Alumiplate™, which employs a bath that is pyrophoric (triethlyaluminum in solvent toluene) and operates above room temperature (at 100° C.). Such aluminum electroplating can be difficult and dangerous to implement due in part to the pyrophoric nature of the plating chemistry and use of organic solvents such as toluene. Toluene is currently listed by the U.S. Environmental Protection Agency (EPA) as a hazardous air pollutant (HAP).

Other advanced coatings processes have been developed but each has shortcomings. Thin film chemical vapor deposition (CVD), physical vapor deposition (PVD), and ion vapor deposition (IVD) are not capable of depositing dense coatings. Dense coating is preferred as a barrier to protect the substrate. Recent advances in ionic liquids and related processes have shown promise for depositing dense aluminum coatings. Electroplating aluminum in room temperature ionic liquids has advantages of non-line-of-sight, green chemistry and absence of flammability compared with alternatives such as the Alumiplate® process and IVD.

It is challenging to attain an adherent metallic coating on aluminum alloys via electroplating due to intrinsically rapid formation or re-formation of aluminum oxide on the Al alloys, regardless of de-oxidation measures implemented prior to plating. Specifically, aluminum alloys are chemically reactive with water and air, forming a native alumina film in ambient conditions. It is believed that removal of the oxide film is necessary for depositing adherent Al coatings. Due to the fast formation of aluminum oxide, it is common to deposit a thin zinc coating in an alkaline zincate solution prior to electroplating in aqueous plating baths, which are often acidic. The zinc immersion coating is deposited onto the aluminum alloys via the exchange reaction between Al and zincate ions. Powdery zinc deposit and inadequate surface coverage is common during the immersion coating application due to the nature of the reaction and the surface heterogeneity of Al alloys, therefore, double immersions with acid (HCl) etching in between immersions are a standard practice prior to electroplating. Partial dissolution of the zinc immersion coating occurs spontaneously in the acidic plating baths and it allows a metallic coating to be partially deposited on aluminum substrates. The lack of acid in the ionic liquid plating bath makes the spontaneous dissolution of the zinc coating impossible, which can lead to adhesion and potentially corrosion issues.

SUMMARY

A method of applying a protective coating with improved adhesion on an aluminum alloy component includes first pretreating the surface of the component by removing the native oxide and foreign contaminants and then depositing a sacrificial protective layer using an immersion coating process. Part or all of the sacrificial layer, as well as portions of the underlying aluminum alloy substrate, are then electrolytically removed in an ionic liquid to generate an active surface for subsequent aluminum electroplating. A protective aluminum coating with improved adhesion is then electrodeposited on the component in an ionic liquid.

A coated metal component includes an aluminum alloy substrate and an electrodeposited protective aluminum coating on the substrate. A rugged interfacial region engineered for bonding strength between the aluminum alloy substrate and aluminum coating enhances coating adhesion. The interfacial layer is produced by first removing the oxide coating and then depositing a sacrificial protective layer in an immersion coating process. Portions of the metal layer as well as portions of the underlying aluminum alloy substrate are then electrolytically removed in an ionic liquid to generate an uneven surface prior to electrodeposition in an ionic liquid of the protective aluminum coating with improved adhesion.

DETAILED DESCRIPTION

Figure 1:
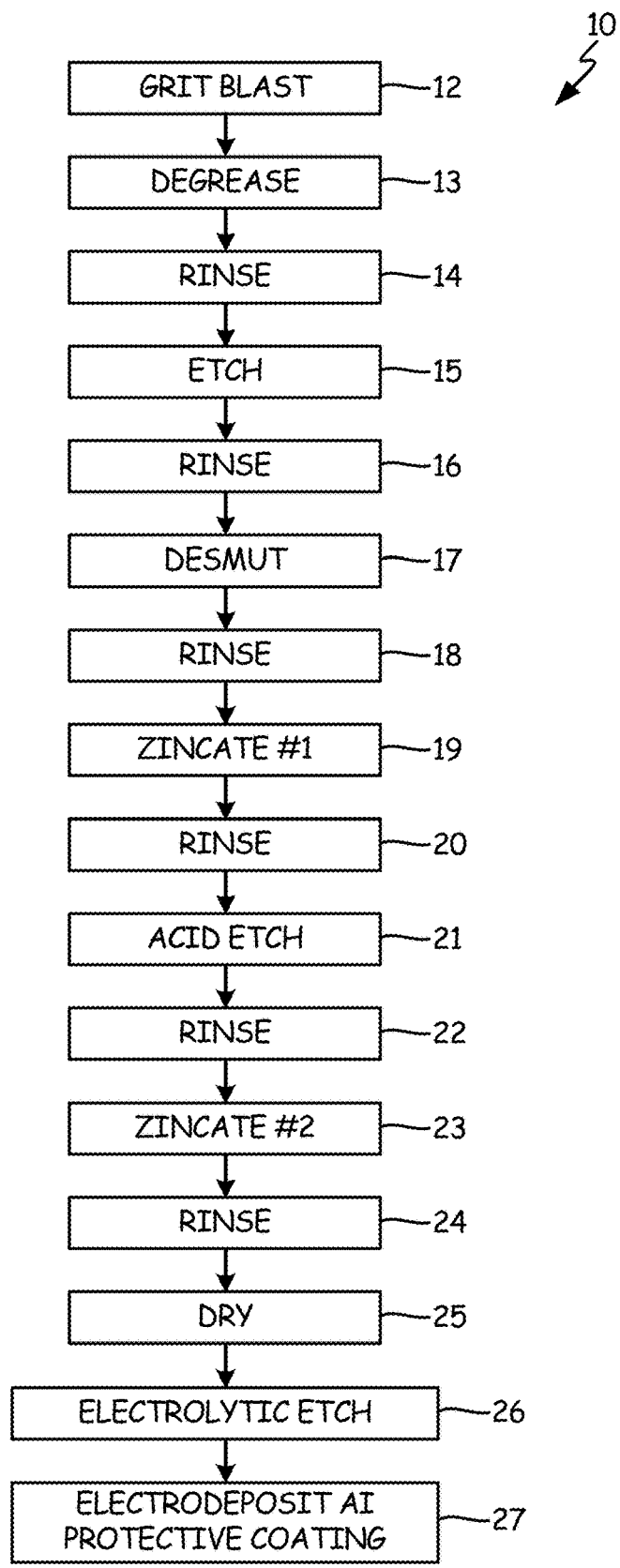
FIG. 1 is a flow chart of a zincating process to apply a sacrificial layer and subsequent electrolytic etching and aluminum plating processes, both conducted in an ionic liquid bath.

Pure aluminum coatings are used in the art to provide anticorrosion protection for high strength aluminum and other alloys. The high specific strength and fatigue resistance of these alloys play major roles in aircraft construction and in the cold sections of an aircraft engine. High strength Al alloys strengthened by the precipitation of secondary phases are susceptible to localized corrosion due to those secondary phases. It is therefore an industrial practice to clad a pure aluminum layer (ca. 5% of a sheet metal thickness) on Al alloys, i.e. Alclad Al alloys. The Al alloys are usually clad in aluminum mechanically by pack rolling processes, thus limited to sheet form. As a result, Alclad cannot be used for the corrosion protection of components of more complex geometry. Other forms of aluminum coating applications including CVD and PVD are useful but are difficult to scale up for components with large area or to apply dense protective aluminum coatings with the required thickness due to their slow deposition rates and the porosity of coatings deposited. These methods are also limited to line-of-sight applications. Electroplating has been used in the art to apply protective aluminum coatings to high strength aluminum alloy components of all shapes. Aluminum cannot be electrodeposited from aqueous solutions. The reason is that during the plating process, water from the aqueous solution dissociates into hydrogen and oxygen at a voltage lower than that necessary to reduce the aluminum complex ions. As mentioned above, the only commercial aluminum electroplating technology in the U.S. is Alumiplate® which employs a pyrophoric bath containing triethylaluminum and toluene and operates above room temperature. The Alumiplate® plating chemistry is pyrophoric and the entire process, including substrate activation, needs to be performed in a closed inert environment. In addition, one of the solvents, toluene, is classified as a hazardous air pollutant.

An attractive process to electroplate aluminum on bulk aluminum alloy and other alloy components is, according to an embodiment of the present invention, electrodeposition from a room temperature ionic liquid. Advantages over prior art are non-line-of-sight deposition, pollution-free (green) chemistry, and a non-flammable process.

The interfacial compatibility and resulting adherence of a pure aluminum coating on, as an example, a high strength aluminum alloy, are sensitive to a number of factors. Aluminum alloys are chemically reactive with water and air and naturally form a dense protective oxide film subsequently. The oxide film can weaken the bonding of the coating due to interfacial structure mismatch or lack of metallurgical bonding. In addition, since high strength aluminum alloys are heat treated to achieve desired mechanical properties, the alloy microstructures will typically not match that of an electrodeposited pure aluminum coating. It is known in the art that interfacial properties critical to coating adhesion include microstructural match, interfacial chemical/atomic bonding and microstructural and mechanical interlock. An embodiment of the invention is to improve electrodeposited aluminum coating adhesion on high strength aluminum and other alloy substrates by forming a sacrificial layer containing one or more of zinc, tin, copper, zirconium, cerium, or other metals and electrochemically etching the protective coating to form an interface with an electroplated aluminum coating that offers improved coating adhesion.

Aluminum alloys are chemically reactive with air and water and an aluminum oxide film naturally forms under ambient conditions. An accepted pretreatment procedure for coating aluminum alloys with aluminum is to remove the oxide coating and deposit a protective metal layer such as zinc to suppress the rapid reformation of aluminum oxide.

Protective zinc and other metal coatings can be formed on aluminum alloys by an immersion coating process in which aluminum and other metal ions are chemically exchanged in solution. For example, in the zincate process, the thick natural oxide layer of aluminum is removed by an alkaline solution, and the exposed aluminum simultaneously reacts with zincate ions in a zincate solution to form a protective zinc layer on the aluminum alloy substrate. A zincate solution is a highly alkaline solution of sodium hydroxide, zinc oxide, complexing agents, and possibly, other metal salts. Zinc deposition occurs according to the following redox reactions:

Dissolution of aluminum

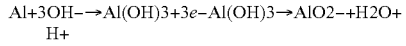

Reduction of zincate and zinc deposition on aluminum

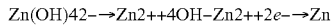

Other metals, if present in solution, may be co-deposited with the zinc.

Initial zinc deposition from a zincate solution may not provide adequate surface coverage typically due to surface heterogeneity of aluminum alloys. Double immersions with acid (HCl) etching between immersions are, therefore, a standard practice in the art prior to electroplating.

Coating process 10 of an embodiment of the invention is shown in FIG. 1. The component is first cleaned by grit blasting to remove oxide scale and debris (Step 12). Degreasing in a mildly alkaline aqueous solution removes oils and other residue (Step 13). Rinsing removes the degreasing solution (Step 14). The component is then etched to remove surface oxides (Step 15). A highly alkaline solution with pH>13 at temperatures of 50-60° C. may be suitable for this step. The etching solution is then rinsed off (Step 16).

Alkaline etch treatments leave intermetallic particles and other insoluble oxides on the aluminum alloy surface that form a discolored coating termed "smut". Removal or "desmutting" is usually carried out with an acid solution at 15-30° C. and results in a clean surface (Step 17). A rinsing step follows smut removal (Step 18).

A protective zinc layer is formed on the clean component surface by immersion in a zincate solution for a few minutes at room temperature (Step 19). Zinc is a typical protective metal coating, although other metals may be used for the immersion coating. Examples include tin, copper, zirconium, cerium, and others known in the art. The thickness of the protective metal layer may be between 20 nm and 5 microns, preferably between 100 nm and 2 microns.

A rinsing step follows the first zincating step (Step 28).

As noted above, two zincating steps are typically used in the art to assure complete protective metal coverage of the aluminum alloy component. As such, the process is repeated by etching the component (Step 21), and rinsing (Step 22) to prepare for a second zincating immersion deposition (Step 23). A final rinse (Step 24) and drying operation (Step 25) produces an aluminum alloy component ready for coating. The processing up to this point is carried out all in ambient without special atmosphere control.

To summarize, the zincating process includes grit blasting, acid etching, desmutting, zincating, rinsing, drying and combinations thereof to deposit a zinc, tin, copper, zirconium, cerium, or other sacrificial metal layers as known in the art to form the initial structure of the invention.

When coating aluminum alloys with metals other than aluminum, conventional acidic plating baths are typically used. In these baths, the zinc immersion coating is spontaneously dissolved before plating begins. Aluminum cannot be plated on aluminum alloys in aqueous acidic baths as mentioned earlier. In an embodiment of the present invention, the protective zinc coating deposited during zincating is electrolytically removed in an ionic liquid (Step 26) and a protective aluminum coating is electrodeposited in ionic liquids (Step 27) in the same or another ionic liquid bath. When the parts are transported between baths, care is taken to keep them wetted by ionic liquid to preserve the activated substrate from reoxidation. Preferred ionic liquids are Lewis acidic di-alkylimidazolium-based chloroaluminates such as 1-ethyl-3-methylimidazolium chloride [EMIM][Cl]—AlCl3 and 1-butyl-3-methylimidazolium chloride [BMIM][Cl]—AlCl3 systems.

The structure and interface chemistry of the etched, zinc coated, aluminum alloy surface and the relation between these features and the adhesion of a final electrodeposited aluminum coating forms the basis of this invention. Coating adhesion can be influenced by many factors including, but not limited to, the physical and chemical nature of the interface between the etched, metal coated aluminum alloy substrate and electrodeposited aluminum coating.

Figure 2:
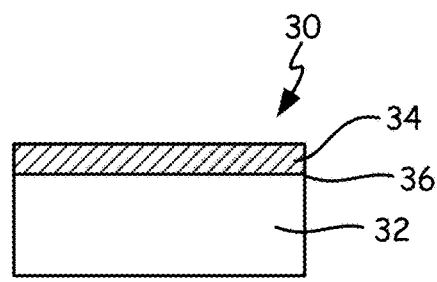
FIG. 2 is a schematic cross section of an immersion coated Al alloy substrate by a zincate process.

A schematic cross section of zincated aluminum alloy component 30 is shown in FIG. 2. Zinc sacrificial coating 34 formed during zincating is schematically shown on aluminum alloy component substrate 32. Surface 36 of aluminum alloy component substrate 32 is schematically shown as interface 36 in coated component 30.

Figure 3A:
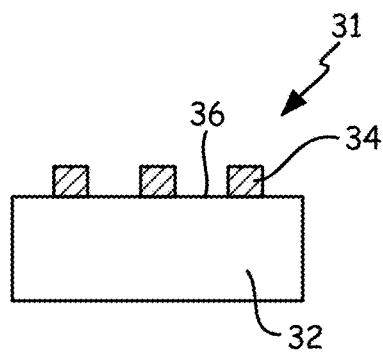
FIG. 3A is a schematic cross section showing partial removal of the sacrificial coating.

In an embodiment, zincated aluminum alloy component 30 is subjected to an electrolytic etch in an ionic liquid to form etched component 31 (Step 26). Portions of sacrificial metal coating 34 have been removed leaving a roughened surface as shown in FIG. 3A comprising "islands" or protuberances of coating 34 over surface 36 of aluminum alloy substrate 32. Aluminum coating 40 is then electrodeposited on etched, zincated aluminum alloy component 31 to form the structure shown in FIG. 3B (Step 27).

Figure 4A:
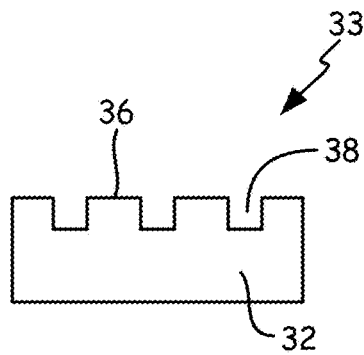
FIG. 4A is a schematic cross section showing complete metal coating removal and partial substrate etching.

In another embodiment, aluminum alloy component 30 is subjected to an electrolytic etch in an ionic liquid to form etched component 33. In this embodiment, all of sacrificial metal coating 34 is removed in addition to portions of aluminum alloy substrate 32. The portions of aluminum alloy 32 that are removed by etching create depressions 38 in surface 36 of aluminum alloy substrate 32 as shown in FIG. 4A. Aluminum coating 40 is then electrodeposited on etched, zincated aluminum alloy component 33 to form the structure shown in FIG. 4B (Step 27). Combinations of protuberances 34 and depressions 38 have been created on a single component by electrolytically etching in an ionic liquid to produce the roughened surface of component 35 shown schematically in FIG. 5A. Aluminum coating 40 is then electrodeposited on etched, zincated aluminum alloy component 35 to form the structure shown in FIG. 5B (Step 27).

Candidate aluminum alloys for the invention include 6061, 7075, 2024, and others known in the art.

Figure 3B:
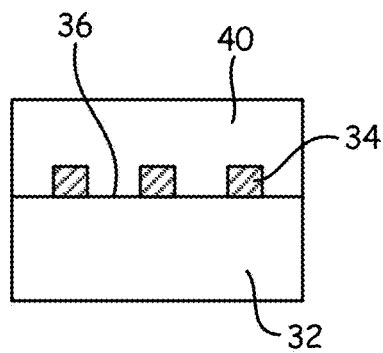
FIG. 3B shows the structure of FIG. 3A with a protective aluminum coating thereon.
Figure 4B:
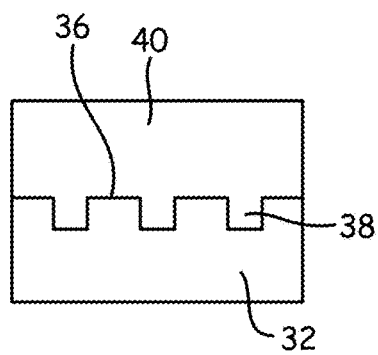
FIG. 4B shows the structure of FIG. 4A with a protective aluminum coating thereon.
Figure 5A:
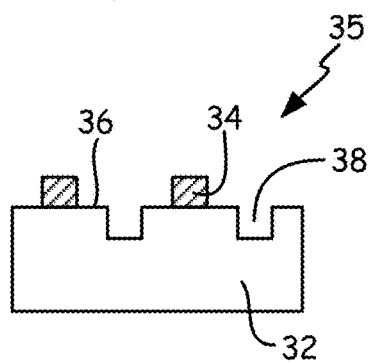
FIG. 5A is a schematic cross section showing partial sacrificial coating removal and partial substrate etching.
Figure 5B:
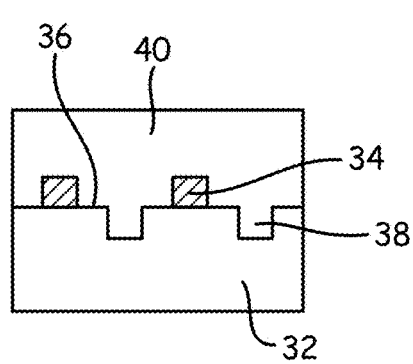
FIG. 5B shows the structure of FIG. 5A with a protective aluminum coating thereon.

When an aluminum protective coating is electrodeposited on aluminum alloy substrate 32 in an ionic liquid, the surface features produced by an electrolytic etch in ionic liquid such as depressions 38 and immersion coating "islands" 34 along interface 36 may aid coating/substrate adhesion by mechanical attachment and increased interfacial contact area as shown in FIGS. 3B, 4B, and 5B.

The surface features illustrated in FIGS. 3B, 4B, and 5B are only suggestive and conceptual. Other larger and smaller scale geometrical surface features are envisioned and are not to be limited to those shown.

Figure 6:
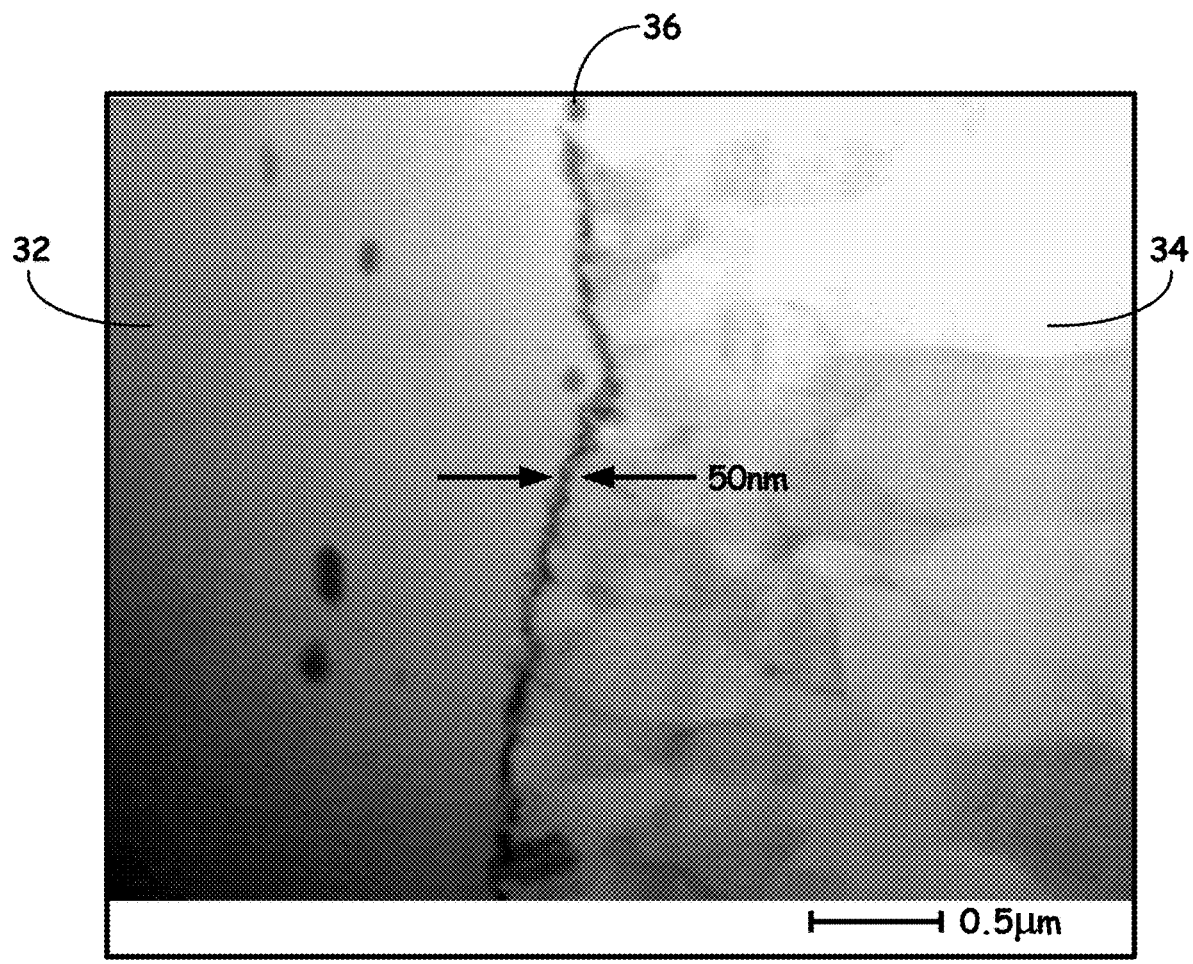
FIG. 6 is a transmission electron microscopy (TEM) image of a sectioned aluminum coated Al alloy prepared using the methods of the invention.

A TEM micrograph of an etched rugged coating/substrate interface cross section of an Al coated alloy component according to the invention is shown in FIG. 6. Contiguous rugged interface 36 between protective electrodeposited aluminum coating 34 and 6061 aluminum alloy substrate 32 is an indication of excellent coating/substrate adhesion. In the example, zincated coated alloy component 30 has been treated according to the process shown in FIG. 1. The surface is not planar and features such as islands 34 and depressions 38 on a micro scale are visible.

Figure 7A:
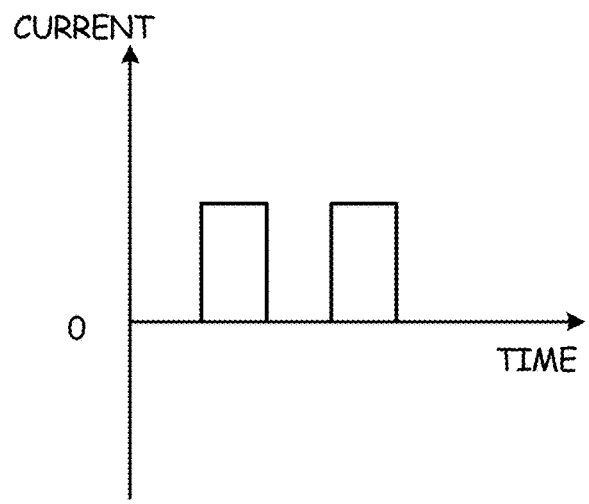
FIGS. 7A and 7B are examples of pulse etching profiles.
Figure 7B:
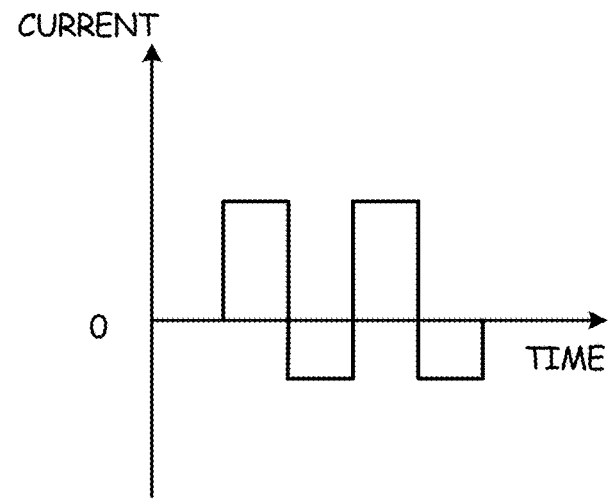

The electrolytic etching is a key process in this invention. Electrolytic etching needs to be controlled such that one or more of the desired interface features are produced. The etching is conducted using direct current or pulse current. Alternatively, potentiostatic or pulse or pulse reverse potential etching can be used to achieve more precise control of species dissolution. The electrochemical potential for converting metallic zinc to chlorozincate ions in acidic 1-ethyl-3-methyl imidazolium chloride-AlCl3 ([EMIM]-AlCl3) (Zn☐Zn2++2e−) is +0.32 volts vs. Al/Al3+ reference electrode. A potential more noble than 0.32 V, with sufficient over-potential provided, will lead to the electrochemical dissolution of zinc as well as that of Al. A potential lower than 0.32 V but higher than 0V, all with respect to Al/Al3+ reference electrode, will predominantly cause Al dissolution. Therefore, controlling the etching parameters can lead to a range of interface features desired in this invention. Two examples of pulse etching profile are shown in FIGS. 7A and 7B. Pulse etching is shown in FIG. 7A and reverse pulse etching is shown in FIG. 7B. As an example, the Al coating electrodeposited in the chloroaluminate ionic liquid at 60° C. with 300 rpm stirring exhibits strong adhesion and several desired aforementioned interface features are shown in the micrograph of FIG. 6.

To summarize, in an embodiment of the invention, the adhesion of protective aluminum coatings electrodeposited on zincated aluminum alloy substrates is enhanced by partially removing a protective zinc coating by electrolytic etching in an ionic liquid to form an artificially rugged surface containing features such as zinc islands or protrusions that improve coating adhesion. In another embodiment, completely removing a protective zinc coating by electrolytic etching in an ionic liquid and continuing to etch to create an uneven substrate surface containing isolated depressions and direct metallurgical bonding between substrate Al alloy and Al coating also improve coating adhesion. In yet another embodiment, combinations of the two above features may further improve coating adhesion.

Discussion of Possible Embodiments

The following are non-exclusive descriptions of possible embodiments of the present invention.

A method of applying a protective aluminum coating with improved adhesion on an aluminum alloy component may include: pre-treating the surface of the component by depositing a sacrificial protective layer using an immersion coating process; electrolytically removing portions or all of the protective layer and portions of the underlying aluminum alloy substrate; and electrodepositing a protective aluminum coating on the component.

The method of the preceding paragraph can optionally include, additionally, and/or alternatively any, one or more of the following features, configurations, and/or additional components:

The sacrificial protective layer may comprise zinc, tin, copper, zirconium, cerium, or combinations thereof;

The immersion coating process may comprise a zincating process;

The immersion coating process may comprise grit blasting, acid etching, desmutting, zincating, rinsing, drying, and combinations thereof to deposit a sacrificial protective layer;

The thickness of the sacrificial layer may be from about 20 nm to about 3 microns;

Electrolytically removing portions of the protective layer and portions of the underlying aluminum alloy substrate may comprise electrolytic etching in an ionic liquid;

The aluminum alloy component may comprise at least 6661 alloy, 7075 alloy, and 2024 alloy;

The protective aluminum coating may comprise substantially pure aluminum;

Electrodepositing a protective aluminum coating may comprise electrodepositing in an ionic liquid;

The ionic liquid may be 1-ethyl-3-methylimidazolium chloride [EMIM][Cl]—AlCl3 or 1-butyl-3-methylimidizolium chloride [BMIM][CL]-AlCl3.

A coated metal component may comprise: an aluminum alloy substrate; an electrodeposited aluminum protective coating on the substrate; and an uneven interfacial boundary between the aluminum alloy substrate and aluminum protective coating comprising potential remnant portions of an electrodeposited sacrificial protective layer on the substrate that was produced by an immersion coating process and was subsequently electrolytically etched as well as etched portions of the aluminum alloy substrate.

The coated component of the preceding paragraph can optionally include, additionally, and/or alternatively, any, one or more of the following features, configurations, and/or additional components:

The aluminum alloy substrate may comprise at least 6061 alloy, 7075 alloy, and 2024 alloy;

The protective aluminum coating may comprise substantially pure aluminum;

The electrodeposited aluminum protective coating may be formed by electrodeposition in an ionic liquid;

The ionic liquid may be 1-ethyl-3-methylimidazolium chloride [EMIM][Cl]—AlCl3 or 1-butyl-3-methylimidizolium chloride [BMIM][CL]-AlCl3;

The immersion coating process may comprise a zincating process;

The zincating process may comprise grit blasting, desmutting, zincating, rinsing, drying, and combinations thereof to deposit a protective layer;

The sacrificial layer may comprise zinc, tin, copper, zirconium, cerium, or combinations thereof;

Electrolytically removing portions of the protective layer and portions of the aluminum alloy substrate may comprise electrolytic etching in an ionic liquid;

The ionic liquid may be 1-ethyl-3-methylimidazolium chloride [EMIM][Cl]—AlCl3 or 1-butyl-3-methylimidizolium chloride [BMIM][CL]-AlCl3.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of applying a protective aluminum coating with improved adhesion on an aluminum alloy component comprising:
   pretreating the surface of the component by depositing a sacrificial protective layer using an immersion coating process;
   electrolytically removing portions of or all of the sacrificial protective layer and portions of the underlying aluminum alloy substrate by electrolytic etching in an ionic liquid to form a roughened surface of the component, wherein the roughened surface is formed by:
   removing all of the sacrificial protective layer and portions of the underlying aluminum alloy substrate to create depressions in the surface of the component in second selected areas; or
   removing portions of the sacrificial protective layer so as to leave protruding islands of the sacrificial protective layer over the surface of the component in first selected areas and removing portions of the underlying aluminum alloy substrate to create depressions in the surface of the component in second selected areas; and
   electrodepositing a protective aluminum coating on the roughened surface of the component.

2. The method of claim 1, wherein the sacrificial protective layer comprises zinc, tin, copper, zirconium, cerium, or combinations thereof.

3. The method of claim 1, wherein the immersion coating process comprises a zincating process.

4. The method of claim 1, wherein the immersion coating process comprises grit blasting, acid etching, desmutting, zincating, rinsing, drying, or combinations thereof to deposit the sacrificial protective layer.

5. The method of claim 4, wherein the thickness of the sacrificial protective layer is from 20 nm to 3 microns.

6. The method of claim 1, wherein the aluminum alloy component comprises at least one of 6061 alloy, 7075 alloy, and 2024 alloy.

7. The method of claim 1, wherein the protective aluminum coating consists essentially of aluminum.

8. The method of claim 1, wherein electrodepositing the protective aluminum coating comprises electrodepositing in an ionic liquid.

9. The method of claim 1, wherein the ionic liquid is 1-ethyl-3-methylimidazolium chloride [EMIM][Cl]—AlCl3 or 1-butyl-3-methylimidizolium chloride [BMIM][CL]-AlCl3.

* * * * *